United States Patent [19]

Aign et al.

[11] 4,369,070

[45] Jan. 18, 1983

[54] AQUEOUS DYESTUFF OR PIGMENT DISPERSIONS

[75] Inventors: Volker Aign, Monheim; Karlheinz Wolf, Leverkusen; Reinhold Hörnle, Cologne; Norbert Pusch; Klaus Walz, both of Leverkusen, all of Fed. Rep. of Germany

[73] Assignee: Bayer Aktiengesellschaft, Leverkusen, Fed. Rep. of Germany

[21] Appl. No.: 290,998

[22] Filed: Aug. 7, 1981

Related U.S. Application Data

[63] Continuation of Ser. No. 884,955, Mar. 9, 1978, abandoned.

[30] Foreign Application Priority Data

Mar. 15, 1977 [DE] Fed. Rep. of Germany ....... 2711240

[51] Int. Cl.$^3$ .......................... C09C 3/08; C09D 7/12; D06P 1/607
[52] U.S. Cl. .................................. 106/308 N; 8/636; 106/293; 106/299; 106/300; 106/301; 106/302; 106/304; 106/305; 106/307
[58] Field of Search .................. 106/308 N, 293, 299, 106/300, 301, 302, 304, 305, 307; 8/636

[56] References Cited

U.S. PATENT DOCUMENTS

| | | | |
|---|---|---|---|
| 2,033,092 | 3/1936 | Bruson | 8/636 |
| 2,832,795 | 4/1958 | Hempel et al. | 8/636 |
| 3,094,499 | 6/1963 | Gassman et al. | 106/308 Q |
| 3,337,360 | 8/1967 | Schonbach et al. | 106/308 N |
| 3,606,988 | 9/1971 | Walz et al. | 8/636 |
| 3,721,524 | 3/1973 | Von der Eltz et al. | 8/636 |
| 3,998,652 | 12/1976 | Aign et al. | 106/293 |

FOREIGN PATENT DOCUMENTS

| | | | |
|---|---|---|---|
| 1041003 | 4/1955 | Fed. Rep. of Germany | 8/636 |
| 1041103 | 10/1958 | Fed. Rep. of Germany | 8/636 |
| 1227609 | 10/1966 | Fed. Rep. of Germany | 8/636 |
| 1454731 | 11/1976 | United Kingdom | 8/636 |

*Primary Examiner*—Maria Parrish Tungol
*Attorney, Agent, or Firm*—Sprung, Horn, Kramer & Woods

[57] ABSTRACT

Aqueous dyestuff dispersions containing water-insoluble dyestuffs and water-soluble oxalkylation products which can be obtained by subjecting aromatic compounds containing phenolic OH groups to a condensation reaction with formaldehyde and amines which contain a NH group which is reactive towards formaldehyde, or containing derivatives of such oxalkylation products are suitable for pigmenting natural or synthetic materials.

3 Claims, No Drawings

AQUEOUS DYESTUFF OR PIGMENT DISPERSIONS

This is a continuation of application Ser. No. 884,955 filed Mar. 9, 1978, now abandoned.

The invention relates to aqueous dyestuff dispersions containing water-insoluble dyestuffs and water-soluble oxalkylation products which can be obtained by subjecting aromatic compounds containing phenolic OH groups to a condensation reaction with formaldehyde and amines which contain a NH group which is reactive towards formaldehyde, or containing derivatives of such oxalkylation products, and to their use for pigmenting natural or synthetic materials.

The dyestuff dispersions preferably contain oxalkylation products of compounds of the formula

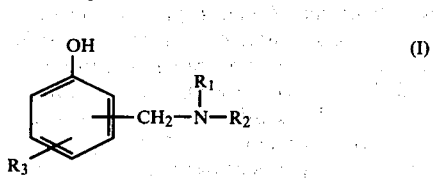

wherein
- $R_1$ denotes the monovalent radical of an optionally substituted aliphatic, cycloaliphatic or aromatic hydrocarbon,
- $R_2$ denotes hydrogen or the monovalent radical of an optionally substituted aliphatic, cycloaliphatic or aromatic hydrocarbon and
- $R_3$ denotes hydrogen, $C_1$–$C_{20}$ alkyl, $C_5$–$C_7$ cycloalkyl, phenyl, benzyl, halogen, hydroxyl, $C_1$–$C_{18}$ alkoxy, carboxyl or $C_1$–$C_{18}$ alkoxycarbonyl.

The oxalkylating reagents which are preferably used are ethylene oxide, propylene oxide, butylene oxide, styrene oxide, glycidol and mixtures of these compounds, but in particular ethylene oxide, optionally conjointly with propylene oxide.

The oxalkylation products of the compounds of the formula I are prepared in a manner which is in itself known, for example in accordance with DT-AS (German Published Specification) No. 1,041,103.

Preferred oxalkylation products are those which are obtained by reacting condensation products formed from $C_6$–$C_{12}$ alkylphenols or phenol together with $C_6$–$C_{20}$ alkylamines or cyclohexylamine and formaldehyde, with 10 to 100, in particular 15 to 50, mols of ethylene oxide.

In addition, the dyestuff dispersions according to the invention can contain further customary additives, such as agents which prevent drying up, for example formamide, glycol or diglycol, anionic or nonionic surface-active agents, for example ethanolammonium dodecylbenzenesulphonate or surface-active addition reaction products of ethylene oxide, such as are described, for example, by N. Schönfeld, preferably ethylene oxide adducts with aromatic oxy compounds, which are obtained by an addition reaction of styrene or its derivatives with phenols, as well as preservatives, for example sodium pentachlorophenate.

Water-insoluble dyestuffs which can be used are preferably pigments, but also disperse dyestuffs and optical brighteners which are sparingly soluble in water.

Pigments which can be used are both organic pigments, for example pigments of the azo, anthraquinone, azaporphine, thioindigo or polycyclic series, and also of the quinacridone, dioxazine, naphthalenetetracarboxylic acid or perylenetetracarboxylic acid series, such as are known from the Coulor Index, 2nd edition, and inorganic pigments, such as zinc sulphides, cadmium sulphides or selenides, ultramarine, titanium dioxide, iron oxides, nickel yellow or chromium-titanium yellow, chromium oxides, chromate pigments and carbon black and mixtures thereof.

The disperse dyestuffs belong, for example, to the azo, anthraquinone, methine, quinophthalone or aminocoumarin series, such as are listed, for example, in the Colour Index, 3rd edition (1971), volume 2, pages 2,483 to 2,741.

Optical brighteners which are sparingly soluble in water belong, for example, to the coumarin, stilbene, naphthalimide or carbostyryl series.

Further water-insoluble dyestuffs which should be mentioned are those which sublime at 160° to 220° C. and are customarily used in transfer printing, as well as sublimable carbinol bases and carbinol base derivatives of cationic dyestuffs.

The dyestuff dispersions according to the invention contain 20 to 65% by weight, preferably 30 to 50% by weight, of dyestuff, 2 to 35% by weight, preferably 4 to 15% by weight, of the oxalkylation products, 0 to 20%, preferably 0 to 5%, of nonionic or anionic surface-active agents, 5 to 20% by weight of water-retaining agents and 15 to 40% by weight of water, the figures relating to the dyestuff dispersion.

The dyestuff dispersions according to the invention were prepared in a customary manner, for example by processing the mixture in conventional wet comminution units, such as kneaders, screw kneaders, ball mills, rotor-stator mills, dissolvers, corundum disc mills, vibratory mills and, particularly advantageously, in high-speed stirred ball mills, using grinding bodies with a size of 0.1 to 100 mm diameter.

The dyestuff dispersions according to the invention can be employed for all purposes and are excellently suitable for the production of emulsion paints based on polyvinyl acetate, polyvinyl acetate copolymers, styrene-butadiene copolymers, polyvinyl propionates, acrylic and methacrylic acid ester polymers, saponified alkyd resins and oil emulsions; for the production of wallpaper paints based on cellulose derivatives such as methylcellulose, hydromethylcellulose and carboxymethylcellulose, and for the production of printing inks which contain, as binders, mainly saponified natural resins, such as shellac, saponified water-soluble synthetic resins or acrylate binder solutions.

Compared with known dyestuff dispersions, such as are known, for example, from DT-OS (German Published Specification) No. 2,421,606, the dyestuff dispersions according to the invention have the advantage that they can be employed more universally and have a considerably lower viscosity at the same concentration dyestuff. Surprisingly better properties are achieved, in particular, in the case of emulsion paints based on (meth-)acrylate homopolymer and copolymer dispersions (see Karsten, Lackrohstoff-Tabellen (Tables of Raw Materials for Lacquers), 5th edition, pages 258–265), such as Plextol ® B-500 and Acronal ® 290 D.

EXAMPLE 1

A mixture consisting of 48% by weight of Pigment Yellow 3 (Coulor Index 11,710), 8% by weight of the oxalkylation product described in the following text, 0.5% by weight of sodium pentachlorophenate, 20% by weight of ethylene glycol and 23% by weight of water is homogenised by stirring and is then ground in a continuously operating stirred ball mill using glass beads of 0.3 to 0.5 mm diameter, until the average partice size is less than 3μ.

The oxalkylation product is prepared by warming 99 g (1 mol) of cyclohexylamine together with 5 g of 20% strength potassium hydroxide solution and 100 g of 30% strength formaldehyde at 70° C. for 3 hours, while stirring, adding 220 g (1 mol) of nonylphenol and heating at 90° to 100° C. for a further 5 hours. The resulting oily reaction product is dried in vacuo, sodium methylate, prepared by dissolving 1.5 g of sodium in methanol, is added and the mixture is heated to 140° to 150° C. 1,230 g (28 mols) of ethylene oxide are run in gradually under a nitrogen atmosphere and under an excess pressure of 1 to 2 atmospheres. The ethylene oxide is rapidly consumed to give a polyglycol ether which dissolves in water to form a clear solution.

EXAMPLE 2

A mixture consisting of 38% by weight of carbon black, 10% of the oxalkylation product below, 0.5% by weight of sodium pentachlorophenate, 15% by weight of ethylene glycol and 36.5% by weight of water is ground, as in Example 1, in a stirred ball mill. 240 g (1 mol) of hexadecylamine, 600 g of water and 10 g of 40% strength potassium hydroxide solution were warmed to 60° C. and 120 g of 30% strength formaldehyde were then added. The mixture is warmed at 70° to 80° C. for 2 hours, while stirring, the lower aqueous layer is then separated off, the oily upper layer is washed with hot water and 100 g of phenol and 20 g of concentrated hydrochloric acid are then added to it and the mixture is again heated to a temperature of 90° to 95° C. After the aqueous layer has once more been separated off, the residual fraction is dried in vacuo, a solution of 2.5 g of sodium in methanol is added and the mixture is reacted at 150° C. and under pressure with 660 g (15 mols) of ethylene oxide.

EXAMPLE 3

A mixture consisting of 48% by weight of Pigment Red 3 (Coulor Index 12,120), 8% by weight of the oxalkylation product described in Example 1, 0.5% by weight of sodium pentachlorophenate, 20% by weight of ethylene glycol and 23.5% by weight of water is ground, as in Example 1, in a stirred ball mill.

EXAMPLE 4

A mixture consisting of 48% by weight of Pigment Green 7 (Coulor Index 74,260), 6.5% by weight of the oxalkylation product described in Example 1, 6.5% by weight of the oxalkylation product described in Example 2, 0.5% by weight of sodium pentachlorophenate, 20% by weight of ethylene glycol and 18.5% by weight of water is ground, as in Example 1, in a stirred ball mill.

EXAMPLE 5

A mixture consisting of 36% by weight of Pigment Yellow 83 (1 mol of dichlorobenzidine diazotised and coupled with 2 mols of acetoaceto-2,5-dimethoxy-4-chloroanilide), 6% by weight of the oxalkylation product described in Example 2, 5% by weight of an oxalkylation product which is obtained by subjecting 2.9 mols of styrene to a condensation reaction with 1 mol of phenol and subsequent ethoxylation with 27 mols of ethylene oxide, 0.5% by weight of a commercially available preservative, 20% by weight of ethylene glycol and 32% by weight of water is kneaded in a dispersion kneader to give a pigment paste, the total quantity of the emulsifier being taken initially and the pigment constituent being introduced. The temperature of the kneading is kept at about 70° C. by adding water if necessary. After a kneading period of 30 minutes an average pigment particle size of less than 2μ is obtained. The pigment paste can be diluted further by kneading with water and diethylene glycol.

EXAMPLE 6

A mixture consisting of 42% by weight of Pigment Yellow 16 (Colour Index 20,040), 6% by weight of the oxalkylation product described in Example 1, 4% by weight of an alkylation product which is obtained by subjecting 2.9 mols of styrene to a condensation reaction with 1 mol of phenol and subsequent ethoxylation with 27 mols of ethylene oxide, 0.5% by weight of a commercially available preservatives, 20% by weight of ethylene glycol and 27.5% by weight of water is made into a pigment paste, as in Example 5, by kneading.

EXAMPLE 7

A mixture consisting of 38.0% by weight of carbon black, 7.0% by weight of the oxalkylation product described in Example 1, 0.5% by weight of a commercially available preservative, 20% by weight of ethylene glycol and 34.5% by weight of water is ground in a stirred mill as in Example 1.

EXAMPLE 8

A mixture consisting of 50.0% by weight of the disperse dyestuff of the formula

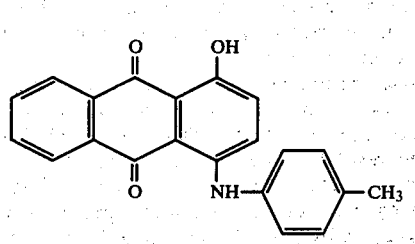

10% by weight of the oxalkylation product described in Example 2, 5.0% by weight of the compound of the formula

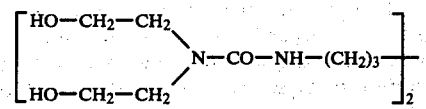

for preventing drying up, 0.5% by weight of a commercially available preservative and 34.5% by weight of water is homogenised by stirring and is then ground, as in Example 1, in a continuously operating stirred ball mill.

EXAMPLE 9

A mixture consisting of 11.1 kg of 1% strength aqueous ammonia, 18.0 kg of titanium dioxide pigment (rutile type) 15.0 kg of barium sulphate pigment, 10.5 kg of ground dolomite, 2.0 kg of talc, 0.3 kg of high-molecular silica for preventing the pigment from settling out in the paste, 0.1 kg of a commercially available preservative, 0.2 kg of sodium hexamethaphosphate, 0.3 kg of a commercially available antifoaming mixture, 0.5 kg of a nonionic emulsifier and 5.0 kg of a 3% strength aqueous solution of hydroxyethylcellulose is homogenised by means of a high-speed stirrer. It is then ground on a single-roll mill and 37 kg of an acrylic resin dispersion are added, while stirring vigorously.

A paint which is stable against flocculation is obtained by stirring 100 g of this white emulsion paint with 0.1 to 10 g of a pigment preparation produced in accordance with Example 1 to 6. When this paint is spread on paper with a 0.09 mm doctor blade, a distinctly greater depth of colour is obtained, compared with analogous emulsion paint which has been prepared in the same concentration using a colour paste according to DT-AS (German Published Specification) No. 2,421,606.

We claim:

1. A pigment dispersion comprising a water-insoluble pigment and a water-soluble oxyalkylation product of the condensation product of (a) phenol or $C_6$-$C_{12}$ alkylphenol, (b) $C_6$-$C_{20}$ alkylamine or cyclohexylamine, and (c) formaldehyde, and 10 to 100 mols of ethylene oxide.

2. A pigment dispersion according to claim 1 wherein said pigment is an azo pigment, an anthraquinone pigment, an azaporphine pigment, a thioindigo pigment, a polycyclic pigment, a quinacridone pigment, a dioxazine pigment, a naphthalenetetracarboxylic acid pigment, a perylenetetracarboxylic acid pigment.

3. A pigment dispersion according to claim 1 wherein said pigment is a zinc sulfide, a cadmium sulfide, a cadmium selenide, ultramarine, titanium dioxide, iron oxide, nickelyellow, chromium-titanium yellow, a chromium oxide, a chromate or a carbon black pigment.

* * * * *